US012743862B2

(12) United States Patent
Lv et al.

(10) Patent No.: US 12,743,862 B2
(45) Date of Patent: Sep. 22, 2026

(54) PROCESSING METHOD FOR IMAGE RECOGNITION MODEL AND RELATED PRODUCT

(71) Applicant: MaShang Consumer Finance Co., Ltd., Chongqing (CN)

(72) Inventors: Yongchun Lv, Chongqing (CN); Hui Zhu, Chongqing (CN); Xunyi Zhou, Chongqing (CN); Ning Jiang, Chongqing (CN); Haiying Wu, Chongqing (CN)

(73) Assignee: MASHANG CONSUMER FINANCE CO., LTD., Chongqing (CN)

(*) Notice: Subject to any disclaimer, the term of this patent is extended or adjusted under 35 U.S.C. 154(b) by 257 days.

(21) Appl. No.: 18/587,550

(22) Filed: Feb. 26, 2024

(65) Prior Publication Data

US 2024/0203081 A1 Jun. 20, 2024

Related U.S. Application Data

(63) Continuation of application No. PCT/CN2023/109265, filed on Jul. 26, 2023.

(30) Foreign Application Priority Data

Aug. 1, 2022 (CN) ......................... 202210918385.4

(51) Int. Cl.

| | |
|---|---|
| ***G06V 10/22*** | (2022.01) |
| ***G06V 10/77*** | (2022.01) |
| ***G06V 10/771*** | (2022.01) |
| ***G06V 10/774*** | (2022.01) |
| ***G06V 10/82*** | (2022.01) |

(52) U.S. Cl.

CPC ............ *G06V 10/22* (2022.01); *G06V 10/771* (2022.01); *G06V 10/7715* (2022.01); *G06V 10/774* (2022.01); *G06V 10/82* (2022.01)

(58) Field of Classification Search

CPC .. G06V 10/22; G06V 10/771; G06V 10/7715; G06V 10/774; G06V 10/82; G06V 10/25; G06V 10/764

See application file for complete search history.

(56) References Cited

U.S. PATENT DOCUMENTS

2019/0286932 A1* 9/2019 Du ......................... G06V 20/00

FOREIGN PATENT DOCUMENTS

| | | |
|---|---|---|
| CN | 112509046 A | 3/2021 |
| CN | 112651291 A | 4/2021 |

(Continued)

OTHER PUBLICATIONS

Z. Yang, Z. Wang, W. Xu, X. He, Z. Wang and Z. Yin, "Region-aware Random Erasing," 2019 IEEE 19th International Conference on Communication Technology (ICCT), Xi'an, China, 2019, pp. 1699-1703, doi: 10.1109/ICCT46805.2019.8947189. (Year: 2019).*

(Continued)

*Primary Examiner* — Siamak Harandi
*Assistant Examiner* — Annie H Pham
(74) *Attorney, Agent, or Firm* — Davis Wright Tremaine LLP

(57) ABSTRACT

Embodiments of the present application provide a processing method for an image recognition model and a related product. The processing method for the image recognition model includes: obtaining an image sample; determining a target object positioning box of the image sample, where the target object positioning box covers an area where an effective feature of the image sample is located; adjusting a pixel value of at least one pixel within the target object positioning box to obtain a preprocessed image sample; and training a network model based on the preprocessed image sample to obtain the image recognition model. The present application improves the concentration of the effective fea- (Continued)

ture in the sample image and thus improves the regularization effect and reduces overfitting of the network model.

20 Claims, 6 Drawing Sheets

(56) References Cited

FOREIGN PATENT DOCUMENTS

| | | | | |
|---|---|---|---|---|
| CN | 113269257 A | * | 8/2021 | ......... G06F 18/2415 |
| CN | 114120004 A | | 3/2022 | |
| CN | 114821242 A | | 7/2022 | |
| JP | 2021179971 A | | 11/2021 | |
| WO | 2019108252 A1 | | 6/2019 | |
| WO | 2022088581 A1 | | 5/2022 | |

OTHER PUBLICATIONS

L. Aziz, M. S. B. Haji Salam, U. U. Sheikh and S. Ayub, “Exploring Deep Learning-Based Architecture, Strategies, Applications and Current Trends in Generic Object Detection: A Comprehensive Review,” in IEEE Access, vol. 8, pp. 170461-170495, 2020, doi: 10.1109/ACCESS.2020.3021508. (See IDS Apr. 14, 2025) (Year: 2020).*

European Patent Office, “Search Report” in Application No. 23849243.3-1207, Jan. 14, 2025, 8 pages.

Ghiasi et al., “DropBlock: A Regularization Method for Convolutional Networks”, Oct. 30, 2018, 11 pages.

Aziz et al., “Exploring Deep Learning-Based Architecture”, Strategies, Applications and Current Trends in Generic Object Detection: A Comprehensive Review, IEEE Access, vol. 8, Sep. 3, 2020, 35 pages.

Zhong et al., “Random Erasing Data Augmentation”, Arxiv.org, Cornell University Library, 201 Olin Library Cornell University Ithaca, NY, Aug. 16, 2017, Sections 3, Datasets, 4. Our Approach, 5, Experiment; Figure 2, 10 pages.

International Search Report issued in related PCT Application No. PCT/CN2023/109265, mailed on Oct. 19, 2023, in 11 pages.

Comparative Learning Series—Twin Networks, dated Mar. 24, 2022, in 4 pages.

Office Action for Chinese Application No. 202210918385.4, mailed Mar. 17, 2026, 35 pages.

* cited by examiner

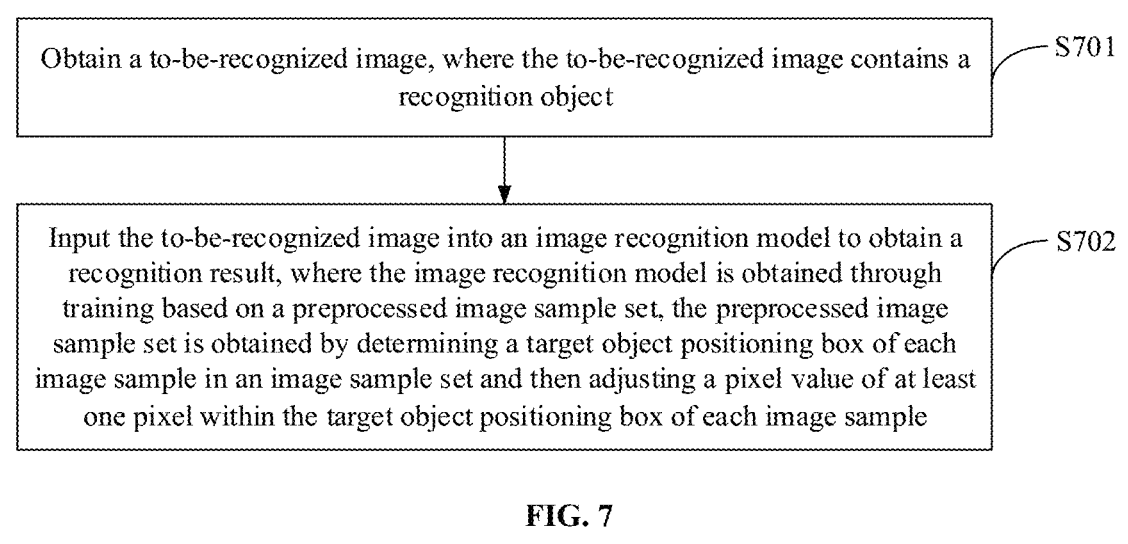

Obtain a to-be-recognized image, where the to-be-recognized image contains a recognition object — S701

Input the to-be-recognized image into an image recognition model to obtain a recognition result, where the image recognition model is obtained through training based on a preprocessed image sample set, the preprocessed image sample set is obtained by determining a target object positioning box of each image sample in an image sample set and then adjusting a pixel value of at least one pixel within the target object positioning box of each image sample — S702

FIG. 7

PROCESSING METHOD FOR IMAGE RECOGNITION MODEL AND RELATED PRODUCT

CROSS-REFERENCE TO RELATED APPLICATIONS

This application is a continuation of International Application No. PCT/CN2023/109265, filed on Jul. 26, 2023, which claims priority to Chinese patent application No. 202210918385.4, entitled "PROCESSING METHOD FOR IMAGE RECOGNITION MODEL AND IMAGE RECOGNITION METHOD" and filed on Aug. 1, 2022. The two applications are incorporated herein by reference in their entireties.

TECHNICAL FIELD

Embodiments of the present application relate to the field of data processing technology, and in particular, to a processing method for an image recognition model and a related product.

BACKGROUND

With the development of deep learning technology, network models are more and more widely applied. As the depth of the network model increases, the overfitting of the network model becomes more and more serious.

In the related art, a regularization method can be used to reduce overfitting of the network model. The existing regularization method generally is to randomly discard part of features of the training samples, and then trains the network model through the training samples obtained after part of the features are discarded.

SUMMARY

Embodiments of the present application provide a processing method for an image recognition model and a related product.

In a first aspect, embodiments of the present application provide a processing method for an image recognition model, including:

- obtaining an image sample;
- determining a target object positioning box of the image sample, where the target object positioning box covers an area where an effective feature of the image sample is located;
- adjusting a pixel value of at least one pixel within the target object positioning box to obtain a preprocessed image sample; and
- training a network model based on the preprocessed image sample to obtain the image recognition model.

In an aspect, embodiments of the present application provide an electronic device, including: a processor, and a memory communicatively connected to the processor;

- the memory stores computer-executed instructions;
- the processor executes the computer-executed instructions stored in the memory to implement the above method.

In an aspect, embodiments of the present application provide a computer-readable storage medium with computer-executed instructions stored therein, a processor, when executing the computer-executed instructions, implements the above method.

In an aspect, embodiments of the present application provide a computer program product, including computer-executed instructions, where the computer-executed instructions, when executed by at least one processor, implement the above method.

In an aspect, embodiments of the present application provide a computer program, where the computer program, when executed by a processor, implements the above method.

BRIEF DESCRIPTION OF DRAWINGS

In order to illustrate the technical solutions in embodiments of the present application or in the related art more clearly, the drawings required for describing the embodiments or the related art will be briefly introduced below. Obviously, the accompanying drawings described below show some embodiments of the present application, and persons of ordinary skill in the art may still derive other drawings from these accompanying drawings without creative efforts.

FIG. 7 is a schematic flowchart of an image recognition method provided by an embodiment of the present application.

DESCRIPTION OF EMBODIMENTS

The technical solutions in embodiments of the present application will be clearly and comprehensively described below with reference to the accompanying drawings in the embodiments of the present application. Obviously, the described embodiments are only some of the embodiments of the present application, rather than all of the embodiments. All other embodiments obtained by those of ordinary skill in the art based on the embodiments in the present application without creative efforts fall within the protection scope of the present application.

The terms "first", "second", "third", "fourth", etc. (if any) in the description and claims of the present application and the above-mentioned drawings are used to distinguish similar objects and are not necessarily used to describe a specific order or sequence. It should be understood that the data used in this way are interchangeable under appropriate circumstances such that the embodiments of the application described herein are also capable of encompassing other sequence examples in addition to those illustrated or described. In addition, the terms "include" and "have" and any variations thereof are intended to cover non-exclusive inclusions. For example, a process, method, system, product, or device that encompasses a series of steps or units are not necessarily limited to those steps or elements explicitly listed, but may include other steps or elements not expressly listed or those inherent to the process, method, system, product or device.

Figure 1:
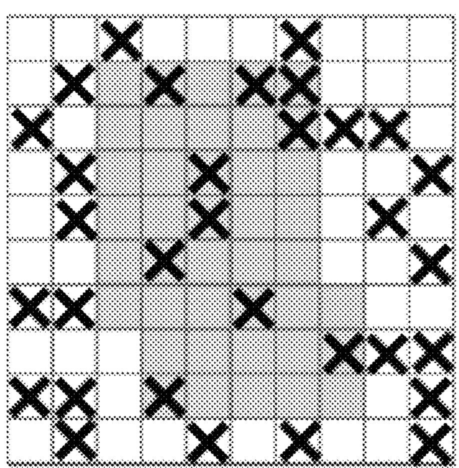
FIG. 1 is a schematic diagram of an application of a regularization method in the related art.

With the development of deep learning technology, network models are increasingly applied in image processing, computer vision, multimedia and other fields. However, as the depth of the network model (which for example can be a deep neural network model) increases, the overfitting of the network model becomes more and more serious, which in turn leads to a decline in the performance of the network model. To this end, various regularization methods suitable for network models have been proposed. For example, regularization methods through such as weight decay or data enhancement can be used to reduce overfitting of the network model. For the data enhancement manner, existing regularization methods completely is to randomly select features and discard them. Randomly selected features are likely to be invalid features. For example, randomly selected features may all be interference information such as background, which in turn leads to unstable effect of the regularization, that is, the regularization performance is apt to be too strong or too weak. For example, FIG. 1 is a schematic diagram of an application of a regularization method in the related art. As shown in FIG. 1, the regularization method can be a dropout regularization. In the embodiment, a gray area is an area where an effective feature of an image sample is located, an area where an X mark is located is a discarded area of the image sample, that is, a feature corresponding to the area where the X mark is located can be ignored when a network model recognizes the image sample. However, the area where the X mark is located is a randomly selected area, and many are background areas without effective feature, which cannot make the effective feature more concentrated, thereby reducing the regularization effect.

Based on the above technical problem, in the present application, by first determining a target object positioning box covering an effective feature area of an image sample, and then adjusting a pixel value of a pixel within the target object positioning box, to enable the image sample to only contain some of the effective feature, the concentration and prominence of the effective feature of the image sample are improved, thus the network model can be motivated to learn more distinguishing features among the remaining effective features of the image sample, thereby achieving the beneficial effects that not only the regularization effect is improved, but also the overfitting of the network model is reduced.

Figure 2:
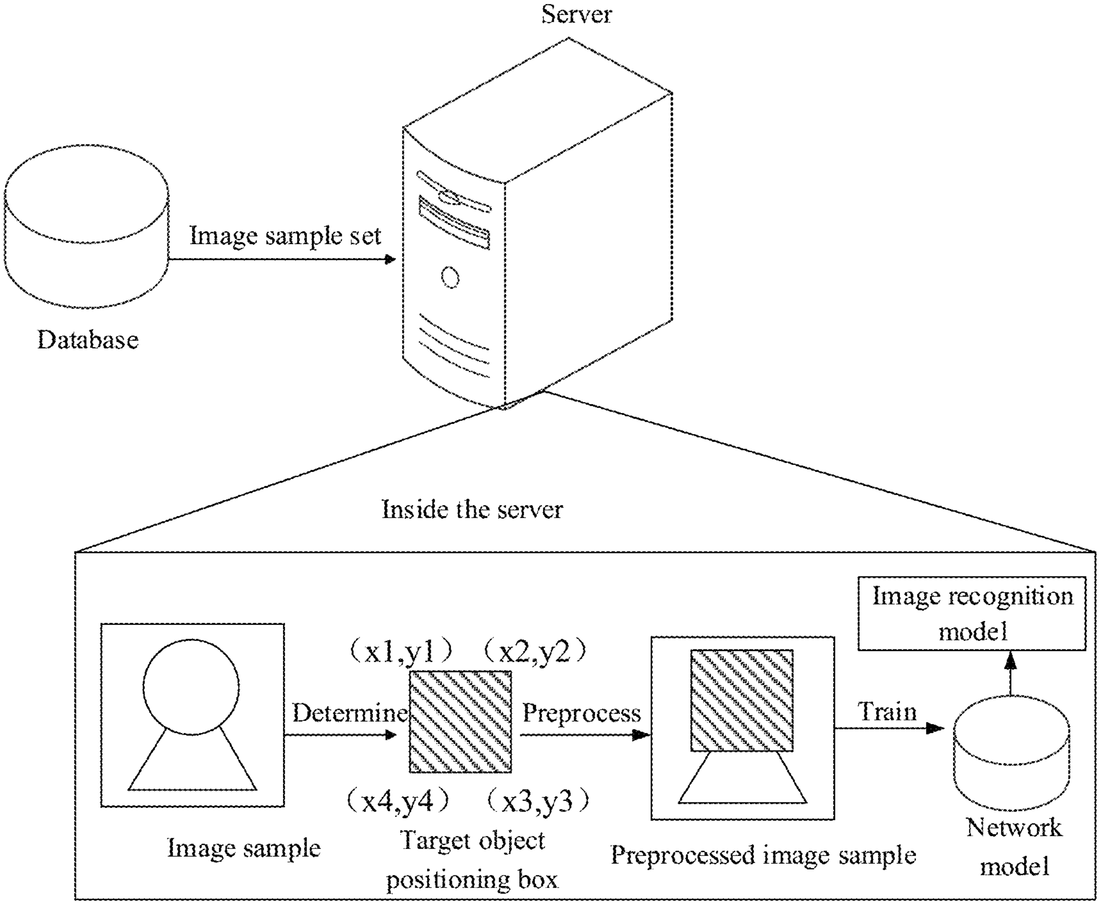
FIG. 2 is a schematic architectural diagram of an application system for a processing method for an image recognition model provided by an embodiment of the present application.

FIG. 2 is a schematic architectural diagram of an application system for a processing method for an image recognition model provided by an embodiment of the present application. As shown in FIG. 2, in the embodiment, the application system can include a server and a database. The database stores an image sample set. The image sample set contains one or more image samples. The image samples can be a human face image, a natural biological classification, etc. A network model is deployed in the server. The server can first obtain the image sample set from the database, and then for each image sample, a target object positioning box of the image sample (for example. the target object positioning box can be a rectangle, a triangle, or other polygons) can be first determined, where the target object positioning box covers an area where an effective feature of the image sample is located. Then, a pixel value of at least one pixel within the target object positioning box can be adjusted, that is, part of the effective feature of the sample image is discarded, for example, pixel values of some pixels can be directly set to zero, to obtain a preprocessed image sample set. Then, a network model is trained based on the preprocessed image sample set to obtain the image recognition model.

The server can be a single server or a server cluster. The technical solution of the present application is described in detail below with specific embodiments. The following specific embodiments can be combined with each other, and the same or similar concepts or processes may not be described again in some embodiments.

Figures 3, 4:
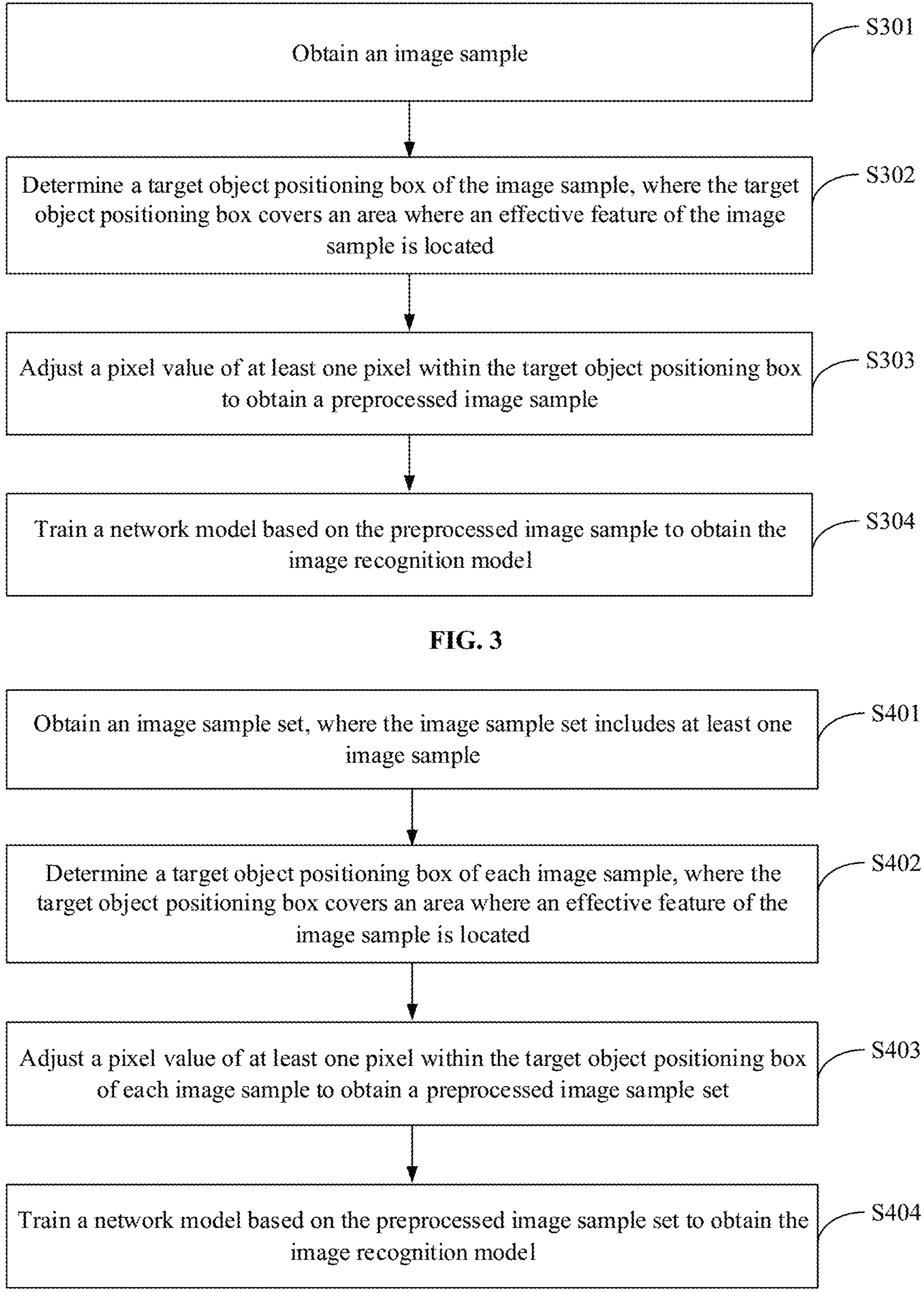
FIG. 3 is a schematic flowchart of a processing method for an image recognition model provided by an embodiment of the present application.
FIG. 4 is a schematic flowchart of a processing method for an image recognition model provided by an embodiment of the present application.

FIG. 3 is a schematic flowchart of a processing method for an image recognition model provided by an embodiment of the present application. The method in the embodiment can be executed by a server. As shown in FIG. 3, the method in the embodiment can include following steps.

S301: obtain an image sample.

In an embodiment, before a network model is trained, a training sample may be obtained first, and then the network model may be trained using the training sample. The training sample can be an image sample. For example, the image sample can be an RGB color image or an index image, and the type of the image sample can be a photo or a screenshot (for example, a video screenshot, a web page screenshot, a chat record screenshot, etc.), and an object contained in the photo or the screenshot can be a traffic sign, a vehicle license plate, a user, an animal, a plant or a building, etc.

In addition, the image sample can be a pre-stored sample obtained from a database or a cloud, or can be a real-time annotated sample, which is not specifically limited here.

S302: determine a target object positioning box of the image sample, where the target object positioning box covers an area where an effective feature of the image sample is located.

After the image sample is obtained, an area where an effective feature of the image sample is located can be determined. During determination of the area where the effective feature of the image sample is located, the area where the effective feature of the image sample is located can be represented by means of a target object positioning box. That is, a feature represented by a pixel within the target object positioning box is the effective feature of the image sample.

In one embodiment, after the area where the effective feature of the image sample is located is determined, a pixel value of a pixel in the area where the effective feature of the image sample is located can be adjusted, so as to discard some of the effective feature of the sample image, making the effective feature of the adjusted image sample more concentrated and prominent, thereby motivating the network model to learn more distinguishing features among the remaining effective features of the image sample.

The effective feature of the image sample refers to a feature corresponding to a target object in the image sample, and the target object can be an object in the image sample that represents the meaning expressed by the image sample. For example, if the type of the image sample is a traffic sign and the target object in the image sample is a left turn sign, then the feature corresponding to the left turn sign is the effective feature of the image sample. The area where the left turn sign is located is the area where the effective feature is located. During adjusting of the pixel value of the pixel within the area where the effective feature of the image sample is located, the pixel value of the pixel of the left turn sign can be adjusted.

S303: adjust a pixel value of at least one pixel within the target object positioning box to obtain a preprocessed image sample.

By determining the target object positioning box of the image sample, it can be know where the effective feature of the image sample are concentrated. Therefore, the pixel value can be adjusted on this basis, and then some of the effective feature of the image sample are discarded, to obtain a preprocessed image sample.

There are many ways to adjust the pixel value of the pixel within the target object positioning box of the image sample. For example, a random selection of at least one pixel within the target object positioning box can be made, and then the pixel value of the selected pixel is changed, thereby discarding the effective feature corresponding to the pixel. Alternatively, a selection of at least one pixel within the target object positioning box can also be made according to a certain selection rule (for example, selecting a center point of the target object positioning box and selecting pixels covered by a circular area with the center point as the origin and a radius of a preset value), and then the pixel value of the selected pixel is changed. In addition, other ways of adjusting the pixel value of the at least one pixel within the target object positioning box of the image sample are also within the protection scope of the present application and will not be discussed in detail here.

S304: train a network model based on the preprocessed image sample to obtain the image recognition model.

After the pixel value of the pixel within the target object positioning box is adjusted to obtain the preprocessed image, the network model (also called an initial image recognition model) can be trained based on the preprocessed image sample to obtain the image recognition model.

In an implementation, when there is an image sample, the image sample can be used to train the network model for multiple times. For example, the image sample can be repeatedly processed to obtain a plurality of reduplicative image samples, and the plurality of reduplicative image samples can be input into the network model. Since the target object positioning box determined for the image sample in each round of training can be different, that is, the effective feature discarded for the image sample in each round of training process can be different. All features of the image sample can be identified by the network model through multiple rounds of training. Therefore, after the network model training is completed, that is, after the image recognition model is obtained, the image recognition model can recognize the complete image.

When there are a plurality of image samples, the processing flow shown in FIG. 3 can be used to process each image sample to obtain a preprocessed image sample, and the preprocessed image sample can be used to train the network model. Of course, for each image sample of the plurality of image samples, the method mentioned above can also be used, for example, multiple rounds of training of the network model can be implemented by repeating the method for multiple times.

With the above solution adopted, an image sample can be obtained first, and then a target object positioning box of the image sample can be determined, where the target object positioning box covers an area where an effective feature of the image sample is located. Then a pixel value of at least one pixel within the target object positioning box of the image sample can be adjusted to obtain a preprocessed image sample. Afterwards, the network model is trained based on the preprocessed image sample to obtain an image recognition model. By first determining the target object positioning box covering the effective feature area of the image sample, and then adjusting the pixel value of the pixel within the target object positioning box, the image sample only contains some of the effective feature, and the concentration and prominence of the effective feature of the image sample are improved. The network model thus can be motivated to learn more distinguishing features among the remaining effective features of the image sample, thereby not only improving the regularization effect, but also reducing the overfitting of the network model.

The above describes a processing method for an image recognition model provided by an embodiment of the present application with reference to FIG. 3. In practice, image samples can also be processed in the form of an image sample set. This process is explained below with reference to FIG. 4. It can be understood that in the following embodiments, there may be more than one image sample, and the processing process for each image sample is similar.

FIG. 4 is a schematic flowchart of a processing method for an image recognition model provided by an embodiment of the present application. The method in the embodiment can be executed by a server. As shown in FIG. 4, the method in the embodiment can include following steps.

S401: obtain an image sample set, where the image sample set includes at least one image sample.

Similar to step S301, in an embodiment, before a network model is trained, a training sample may be obtained first, and then the network model may be trained using the training sample. The training sample can be an image sample. For example, the image sample can be an RGB color image or an index image, and the type of the image sample can be a photo or a screenshot (for example, a video screenshot, a web page screenshot, a chat record screenshot, etc.), and an object contained in the photo or the screenshot can be a traffic sign, a vehicle license plate, a user, an animal, a plant or a building, etc.

The obtained at least one image sample (one or more image samples) may form the image sample set.

In addition, the image sample in the image sample set can be a pre-stored sample obtained from a database or a cloud, or can be a real-time annotated sample, which is not specifically limited here.

S402: determine a target object positioning box of each image sample, where the target object positioning box covers an area where an effective feature of the image sample is located.

In an embodiment, after the image sample set is obtained, for each image sample in the image sample set, an area where an effective feature of the image sample is located can be determined first, and then a pixel value of a pixel in the area where the effective feature of the image sample is located can be adjusted, so as to discard some of the effective feature of the sample image, making the effective feature of the adjusted image sample more concentrated and prominent, thereby motivating the network model to learn more distinguishing features among the remaining effective features of the image sample.

The effective feature of the image sample refers to a feature corresponding to a target object in the image sample, and the target object can be an object in the image sample that represents the meaning expressed by the image sample. For example, if the type of the image sample is a traffic sign and the target object in the image sample is a left turn sign, then the feature corresponding to the left turn sign is the effective feature of the image sample. The area where the left turn sign is located is the area where the effective feature is located. During adjusting of the pixel value of the pixel within the area where the effective feature of the image sample is located, the pixel value of the pixel of the left turn sign can be adjusted.

In an embodiment, during determination of the area where the effective feature of the image sample is located, the area where the effective feature of the image sample is located can be represented by means of a target object positioning box. That is, a feature represented by a pixel within the target object positioning box is the effective feature of the image sample.

A shape of the target object positioning box can be customized and set according to the actual application scenario. In an embodiment, the shape of the target object positioning box may be a triangle, a rectangle, or other polygon, and the specific position of the target object positioning box may be represented by the coordinate value of each vertex of the target object positioning box.

Figure 5:
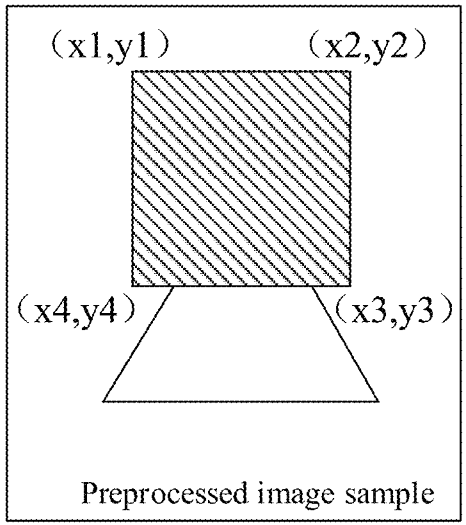
FIG. 5 is a schematic diagram of an application of a target object positioning box provided by an embodiment of the present application.

For example, FIG. 5 is a schematic diagram of an application of a target object positioning box provided by an embodiment of the present application. As shown in FIG. 5, in the embodiment, the target object positioning box is a rectangle, and the coordinates of the four vertices are (x1, y1), (x2, y2), (x3, y3) and (x4, y4).

S403: adjust a pixel value of at least one pixel within the target object positioning box of each image sample to obtain a preprocessed image sample set.

In an embodiment, after the target object positioning box of each image sample in the image sample set is obtained, the pixel value of the at least one pixel within the target object positioning box of each image sample can be adjusted, thus discarding some of the effective feature of the image sample, to obtain the preprocessed image sample set.

In an implementation, there may be many ways to adjust the pixel value of the at least one pixel within the target object positioning box of each image sample. A random selection of at least one pixel within the target object positioning box can be made, and then the pixel value of the selected pixel is changed, thereby discarding the effective feature corresponding to the pixel. In another possible implementation, a selection of at least one pixel within the target object positioning box can also be made according to a certain selection rule (for example, selecting a center point of the target object positioning box and selecting pixels covered by a circular area with the center point as the origin and a radius of a preset value), and then the pixel value of the selected pixel is changed. In addition, other ways of adjusting the pixel value of the at least one pixel within the target object positioning box of the image sample are also within the protection scope of the present application and will not be discussed in detail here.

S404: train a network model based on the preprocessed image sample set to obtain the image recognition model.

In the embodiment, after the preprocessed image sample set is obtained, the network model (which may also be called an initial image recognition model) can be trained using the preprocessed image sample set to obtain the image recognition model.

In addition, during training of the network model through the image sample set, the network model can be trained for multiple rounds through the image sample set, or the image sample set contains a plurality of reduplicative image samples. Therefore, an image sample can be input into the network model for multiple times, and the target object positioning box determined for the image sample in each round of training can be different, that is, the effective feature discarded for the image sample in each round of training process are different. All features of the image sample can be identified by the network model through multiple rounds of training. Therefore, after the network model training is completed, that is, after the image recognition model is obtained, the image recognition model can recognize the complete image.

With the above solution adopted, an image sample set containing at least one image sample can be obtained first. For each image sample, a target object positioning box of the image sample can be determined first, where the target object positioning box covers an area where an effective feature of the image sample is located. Then a pixel value of at least one pixel within the target object positioning box of each image sample can be adjusted to obtain a preprocessed image sample set. Afterwards, the network model is trained based on the preprocessed image sample set to obtain an image recognition model. By first determining the target object positioning box covering the effective feature area of the image sample, and then adjusting the pixel value of the pixel within the target object positioning box, the image sample only contains some of the effective feature, and the concentration and prominence of the effective feature of the image sample are improved. The network model thus can be motivated to learn more distinguishing features among the remaining effective features of the image sample, thereby not only improving the regularization effect, but also reducing the overfitting of the network model.

Furthermore, after the image recognition model is obtained, image recognition can further be performed by using the image recognition model. The specific process can be, for example, as follows.

First, a to-be-recognized image can be obtained, where the to-be-recognized image contains a recognition object. The recognition object here refers to an object of interest, which may include, for example, at least one of a traffic sign, a vehicle license plate, a user, an animal, a plant and a building.

Then, the to-be-recognized image can be input into the image recognition model to obtain a recognition result. The image recognition model is obtained through training based on the preprocessed image sample set. The preprocessed image sample set is obtained by determining the target object positioning box of each image sample in the image sample set and then adjusting the pixel value of the at least one pixel within the target object positioning box of each image sample.

Since the above image recognition model is obtained through training based on the preprocessed image sample set, each image sample in the preprocessed image sample set only contains some of the effective feature. Therefore, the effective feature of the image sample are more prominent and concentrated. When recognizing the preprocessed image sample, the network model can learn more distinguishing features among the remaining effective features of the image sample, which not only improves the recognition accuracy of the network model, but also improves the regularization effect and reduces the overfitting of the network model.

Based on the method in FIG. 4, the embodiments of this specification also provide some specific implementations of the method, which will be described below.

In an embodiment, the determining the target object positioning box of each image sample may specifically include:

inputting the image sample into a self-supervised learning model to obtain feature map information, where the self-supervised learning model is used to extract the effective feature of the image sample; and determining the target object positioning box of the image sample according to the feature map information.

In the embodiment, for each image sample, an approximate location of the effective feature of the image sample can be determined first, and then the approximate location of the effective feature of the image sample is represented by the target object positioning box.

In an implementation, the approximate location of the effective feature of the image sample can be determined through a pre-trained self-supervised learning model. In addition, in order to improve the recognition result of the self-supervised learning model, an image sample can be input into the self-supervised learning model for multiple times to obtain a plurality pieces of feature map information. The feature map information is used to represent a degree to which each pixel in the image sample contains an effective feature. The larger the value, the higher the degree of containing the effective feature. Moreover, the setting of the number of inputs can be compatible with the recognition accuracy of self-supervised learning model and the computing resources of the server. For example, the number of inputs can be any natural number from 30 to 50.

In addition, the self-supervised learning model can directly maximize the similarity of two views of an image without using negative samples and without requiring a momentum encoder. For example, for an image x, two random augmentations are performed in alignment to obtain two different views $x_1$ and $x_2$. Then $x_1$ and $x_2$ can be used as inputs to the self-supervised learning model. The two views $x_1$ and $x_2$ can go through an encoding network f of the self-supervised learning model respectively. The encoding network includes a backbone network (backbone) and a prediction MLPhead layer (can be recorded as h). The encoding network f has parameters shared between the two views. h can convert an output of one view and match this output with the other view to obtain two output vectors $p_1$, $z_2$, $p_1=h(f(x_1))$, $z_2=f(x_2)$, then a negative cosine similarity between $p_1$ and $z_2$ can be minimized by the expression:

$$D(p_1, z_2) = -\frac{p_1}{\|p_1\|_2} \cdot \frac{z_2}{\|z_2\|_2}$$

Then a loss value of the self-supervised learning model is determined through the expression:

$$L = \frac{1}{2}D(p_1, z_2) + \frac{1}{2}D(p_2, z_1)$$

Here, this loss function that determines the loss value is a symmetric loss function, $p_2=h(f(x_2))$, $z_1=f(x1)$.

In summary, by way of determining the feature map information of the image sample based on the self-supervised learning model, the efficiency and accuracy of determining the feature map information is improved, and the accuracy and efficiency of determining the target object positioning box of the image sample that represents the area where the effective feature is located is thus improved.

In an implementation, an amount of the feature map information is N, and N is a natural number greater than or equal to 1. The determining the target object positioning box of the image sample according to the feature map information may specifically include:

for each piece of the feature map information, performing a normalization processing on the feature map information to obtain a heat map, determining a target point with a heat value greater than a preset threshold from the heat map, and determining an initial target object positioning box based on the target point, where the heat map contains at least one pixel, a magnitude of a heat value of the pixel represents a probability that the pixel contains an effective feature, and the heat value of the at least one pixel is within a preset interval; and determining an average value of the N initial target object positioning boxes to obtain the target object positioning box.

For a certain image sample, the image sample can be input into the self-supervised learning model for N times to obtain N pieces of feature map information, and then based on the above two steps, the target object positioning box of the image sample is determined based on the N pieces of feature map information.

A piece of feature map information can contain a plurality of pixels, and each pixel corresponds to a pixel value. The size of the pixel value can indicate the degree to which the pixel contains an effective feature. Therefore, the approximate distribution area of the effective feature can be determined based on the feature map information, and be represented through the target object positioning box.

In an implementation, since the pixel values of the pixels in the feature map information are spread out, it is not conducive to determining the approximate distribution area of the effective feature. Therefore, the pixels in the feature map information can be normalized first to obtain a heat map. The pixels in the heat map correspond to the pixels in the feature map information in a one-to-one manner, and the pixel values of the pixels in the feature map information after normalization can be called heat values. The size of the heat value can represent the probability that the pixel contains an effective feature, or can also be called the degree to which the pixel contains an effective feature. In addition, the heat value of the pixel in the heat map can be within a preset interval. For example, the preset interval can be [0, 1]. In addition, existing normalization approaches can be adopted, and will not be discussed in detail here.

In addition, after the heat map is obtained, according to a preset threshold, the target point whose heat value is greater than the threshold can be determined from the heat map, and the initial target object positioning box can be determined based on the target point. In an implementation, the initial target object positioning box can be determined through an expression:

$$B = K(\mathbb{1}[M > i])$$

Here, M represents a heat value of a respective pixel in the heat map, i represents the preset threshold, and $\mathbb{1}$ represents an indicator function. This indicator function can have the target point whose heat value is greater than the preset threshold obtained from the heat map, and K is a function for calculating closure (for example, it can be a function that calculates the closure of a rectangle). Through K, an initial target object positioning box B can be returned according to a target.

In summary, by first normalizing the pixel s in the feature map information to obtain a heat map, and then filtering the pixel s in the heat map to make the heat value of the pixel more concentrated, and then determining the target object positioning box based on the filtered pixels, the accuracy of determining the target object positioning box is improved.

In addition, if N is 1, the initial target object positioning box is determined as the target object positioning box. If N is a natural number greater than 1, after the N initial target object positioning boxes are obtained, the average value of the N initial target object positioning boxes can be determined to obtain the target object positioning box.

Further, the initial target object positioning box is a polygonal box, and the determining the average value of the N initial target object positioning boxes to obtain the target object positioning box may specifically include:

for each vertex of any one of the N initial target object positioning boxes, determining an average value of coordinates corresponding to each vertex, where a number of coordinates of each vertex is N; and obtaining the target object positioning box according to the average value of the coordinates corresponding to each vertex.

Specifically, the initial target object positioning box is a polygonal box (for example, it can be a rectangle, a triangle or other polygons), and can have a plurality of vertices. The N initial target object positioning boxes have a same number of vertices. After the N initial target object positioning boxes are obtained, for each vertex of any one of the initial target object positioning box, the average value of the coordinates corresponding to the N vertices (i.e. which correspond to a certain vertex at N locations respectively in the N initial target object positioning boxes) can be determined, and the target object positioning box can be determined based on the average value of the coordinates corresponding to each vertex. For example, N can be 3, and the initial target object positioning box can be a rectangle, with the coordinates of one certain vertex being (x11, y11), (x21, y21) and (x31, y31) respectively, then the coordinate of this vertex in the target object positioning box can be:

$$\left(\frac{x11+x21+x31}{3}, \frac{y11+y21+y31}{3}\right)$$

In summary, by determining the target object positioning box based on the average value of the N initial target object positioning boxes, the accuracy of determining the target object positioning box is further improved. In addition, the graph formed by target points may be an irregular graph. By returning a regular initial target object positioning box corresponding to the target points through a function for calculating closure, the determination process of the target object positioning box is simplified.

In another embodiment, the adjusting the pixel value of the at least one pixel within the target object positioning box of each image sample to obtain the preprocessed image sample set may specifically include:

for each image sample, generating an associated image corresponding to the image sample according to the target object positioning box of the image sample, where a size of the associated image is identical to a size of the image sample; and adjusting the pixel value of the at least one pixel within the target object positioning box of each image sample according to the associated image corresponding to each image sample to obtain the preprocessed image sample set.

In an embodiment, after the target object positioning box of the image sample is obtained, the image sample can be preprocessed according to the target object positioning box to obtain an image sample that only contains some of the effective feature. During preprocessing of the image sample, the associated image corresponding to the image sample can be generated according to the target object positioning box of the image sample, and then the pixel value of the at least one pixel within the target object positioning box can be adjusted according to the associated image corresponding to the image sample, and the aforementioned process is repeated for each image sample to obtain the preprocessed image sample set. The associated image can be an image with the same size as the image sample, and the pixel value of each pixel in the associated image can be customized and set according to actual needs. For example, if the size of the image sample is 20*20 pixels, the size of the associated image is also 20*20 pixels.

In an implementation, the process of adjusting the pixel value of the at least one pixel within the target object positioning box of each image sample to obtain the preprocessed image sample set can be performed in the server, that is, the training sample input to the network model is a preprocessed training sample. This network model training manner has wide applicability and can be applied to various types of models.

In addition, the image sample set and the target object positioning box of each image sample in the image sample set can also be input as training samples into the network model for training. The network model can include an external convolution layer which can adjust the pixel value of the at least one pixel within the target object positioning box of each image sample to obtain the preprocessed image sample set. Then other layers in the network model can be trained based on the preprocessed image sample set to obtain the image recognition model. After the training of the image recognition model is completed, the external convolution layer can be removed, that is, during application of the image recognition model, there is no need to preprocess the image sample. The regularization effect of this network model training manner is better, but is applicable to a small range and may not work on some types of models.

Further, the generating the associated image corresponding to the image sample according to the target object positioning box of the image sample may specifically include:

generating an initial associated image with a same size as the image sample;

selecting M center points from the initial associated image, and determining M target areas based on the M center points, where M is a natural number greater than or equal to 1, and the M center points are pixels within the target object positioning box; and setting a pixel value of at least one pixel in the initial associated image to generate the associated image corresponding to the image sample, where the pixel in the initial associated image contains a pixel corresponding to the M target areas and a pixel corresponding to an area other than the M target areas, and a pixel value of the pixel corresponding to the M target areas is set in a different manner than a pixel value of the pixel corresponding to the area other than the M target areas.

During generation of the associated image corresponding to the image sample, an initial associated image can be generated first. The size of the initial associated image is identical to the size of the image sample, that is, the number of pixel contained in the initial associated image is equal to the number of pixel contained in the image sample, and the pixel contained in the initial associated image correspond to the pixel contained in the image sample in a one-to-one manner, that is, the coordinates of the corresponding pixel are the same. For example, if the size of the image sample is 20*20 pixels, the size of the initial associated image is also 20*20 pixels, and the coordinates of the corresponding pixels in the image sample and the initial associated image are the same. In addition, the pixel value of each pixel in the initial associated image can be zero, or can be any value, or no setting is performed for such pixel value.

After the initial associated image is generated, M center points can be selected from the initial associated image, and the M center points are all pixels within the target object positioning box, and then M target areas can be determined based on the M center points. After the M target areas are determined, the pixel value of the pixel corresponding to the M target areas in the initial associated image as well as the pixel value of the pixel corresponding to an area other than the M target areas can be set, to generate the associated image corresponding to the image sample.

Setting the pixel value of the pixel corresponding to the M target areas to generate the associated image corresponding to the image sample may specifically include:

randomly setting the pixel value of the pixel corresponding to the M target areas; and setting the pixel value of the pixel corresponding to the area other than the M target areas in the initial associated image to 1 to obtain the associated image corresponding to the image sample.

During setting of the pixel value of each pixel in the initial associated image, since subsequently effective feature discarding for the image sample need to be performed through the associated image, the pixel contained in the area other than the M target areas can be set to 1. Then the pixel value of the pixel corresponding to the M target areas can be randomly set. For example, the pixel value of the pixel corresponding to the M target areas can be set to 0, or the pixel value of the pixel corresponding to the M target areas can be randomly set to any value. In addition, if the pixel values of the pixels corresponding to the M target areas are all set to 1 in the random setting, since the probability of such a situation is low, this will have little impact on most training data. Therefore, the associated image can also be directly used for later processing.

Figure 6:
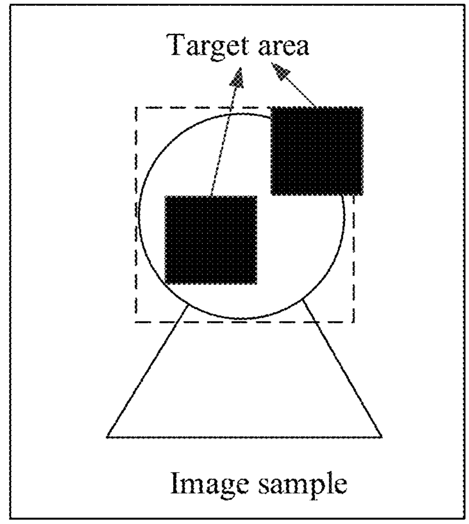
FIG. 6 is a schematic diagram of a principle of an application process of an associated image provided by an embodiment of the present application.

For example, FIG. 6 is a schematic diagram of a principle of an application process of an associated image provided by an embodiment of the present application. As shown in FIG. 6, in the embodiment, a dashed-line box can represent the target image positioning box, there are 2 center points in the target image positioning box, and then two target areas with 2*2 pixels can be generated based on the two center points.

Adjusting the pixel value of the at least one pixel within the target object positioning box according to the associated image corresponding to the image sample to obtain the preprocessed image sample set may specifically include:

for each image sample, multiplying a pixel value of each pixel of the image sample by a pixel value of a corresponding pixel of the associated image to obtain the preprocessed image sample set.

In summary, by first generating an initial associated image, and then setting the pixel values of pixels in different areas of the initial associated image by using different setting manners, to obtain an associated image, in which some of the effective feature of the sample image are discarded through the generated associated image, the accuracy and efficiency of effective feature discarding for the sample image is improved, the network model is thereby motivated to capture more comprehensive features more effectively and the performance of the network model is thus improved. In addition, for image samples of the same specification, an initial associated image can also be shared without needing to generate an additional initial associated image each time, which further improves the discarding efficiency of the effective feature of the sample image.

In addition, during adjusting of the pixel value of the at least one pixel within the target object positioning box of each image sample to obtain the preprocessed image sample set, instead of using the associated image, it is also possible to directly determine the target area that the target object positioning box belongs to from the image sample and then change the pixel value of the pixel corresponding to the target area, which simplifies the discarding process of the effective feature of the sample image and further improves the discarding efficiency of the effective feature of the sample image.

In summary, the regularization method proposed in the present application can be applied to a training process of a convolutional neural network, and can effectively prevent the overfitting of model training. By directional occlusion of some of the effective feature of the target object, the model can be motivated to actively learn more distinguishing features except the occluded important features.

FIG. 7 is a schematic flowchart of an image recognition method provided by an embodiment of the present application. The method of the embodiment can be executed by a server. As shown in FIG. 7, the method of the embodiment can include the following steps.

S701: obtain a to-be-recognized image, where the to-be-recognized image contains a recognition object. The recognition object here refers to an object of interest, which may include, for example, at least one of a traffic sign, a vehicle license plate, a user, an animal, a plant and a building;

S702: input the to-be-recognized image into an image recognition model to obtain a recognition result, where the image recognition model is obtained through training based on a preprocessed image sample set, the preprocessed image sample set is obtained by determining a target object positioning box of each image sample in an image sample set and then adjusting a pixel value of at least one pixel within the target object positioning box of each image sample.

In this embodiment, after the trained image recognition model is obtained, the to-be-recognized image can be recognized based on the trained image recognition model. The to-be-recognized image can be a photo or a screenshot (for example, a video screenshot, a web page screenshot, a chat record screenshot, etc.), and an object contained in the photo or the screenshot can be a traffic sign, a vehicle license plate, a user, an animal, a plant or a building, etc. In addition, the image recognition model is obtained through training based on the preprocessed image sample set. Each image sample in the preprocessed image sample set only contains some of the effective feature. Therefore, the effective feature of the image sample are more prominent and concentrated. When recognizing the preprocessed image sample, the network model can learn more distinguishing features among the remaining effective features of the image sample, which not only improves the recognition accuracy of the network model, but also improves the regularization effect and reduces the overfitting of the network model.

In an implementation, the image recognition model is obtained through training using the aforementioned processing method for the image recognition model.

Figure 8:
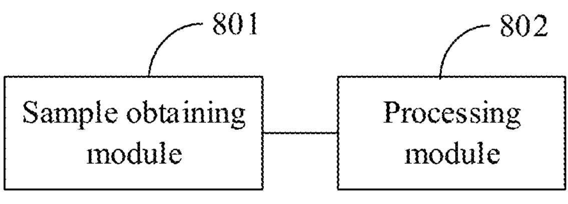
FIG. 8 is a schematic structural diagram of a processing apparatus for an image recognition model provided by an embodiment of the present application.

Based on the same idea, embodiments of this specification also provide an apparatus corresponding to the above method. FIG. 8 is a schematic structural diagram of a processing apparatus for an image recognition model provided by an embodiment of the present application. As shown in FIG. 8, the apparatus provided by this embodiment of the present application may include:

a sample obtaining module 801, configured to obtain an image sample; and a processing module 802, configured to determine a target object positioning box of the image sample, where the target object positioning box covers an area where an effective feature of the image sample is located;

the processing module 802 is further configured to adjust a pixel value of at least one pixel within the target object positioning box to obtain a preprocessed image sample;

the processing module 802 is further configured to train a network model based on the preprocessed image sample to obtain the image recognition model.

Further, the processing module 802 is specifically configured to:

obtain an image sample set, where the image sample set includes at least one of the image sample.

Further, the processing module 802 is specifically configured to:

adjust the pixel value of the at least one pixel within the target object positioning box of each image sample, and form the at least one preprocessed image sample into a preprocessed image sample set.

Further, the processing module 802 is specifically configured to:

input the image sample into a self-supervised learning model to obtain feature map information, where the self-supervised learning model is used to extract the effective feature of the image sample; and determine the target object positioning box of the image sample according to the feature map information.

Further, an amount of the feature map information is N, and N is a natural number greater than or equal to 1, the processing module 802 is specifically configured to:

for each piece of the feature map information, perform a normalization processing on the feature map information to obtain a heat map, determine a target point with a heat value greater than a preset threshold from the heat map, and determine an initial target object positioning box based on the target point, where the heat map contains at least one pixel, a magnitude of a heat value of the pixel represents a probability that the pixel contains an effective feature, and the heat value of the at least one pixel is within a preset interval; and determine an average value of the N initial target object positioning boxes to obtain the target object positioning box.

Further, the initial target object positioning box is a polygonal box, and the processing module 802 is specifically configured to:

for each vertex of any one of the N initial target object positioning boxes, determine an average value of coordinates corresponding to each vertex, where a number of coordinates of each vertex is N; and obtain the target object positioning box according to the average value of the coordinates corresponding to each vertex.

Further, the processing module 802 is specifically configured to:

for each image sample, generate an associated image corresponding to the image sample according to the target object positioning box of the image sample, where a size of the associated image is identical to a size of the image sample; and adjust the pixel value of the at least one pixel within the target object positioning box of each image sample according to the associated image corresponding to each image sample to obtain the preprocessed image sample set.

Further, the processing module 802 is specifically configured to:

generate an initial associated image with a same size as the image sample;

select M center points from the initial associated image, and determine M target areas based on the M center points, where M is a natural number greater than or equal to 1, and the M center points are pixels within the target object positioning box; and set a pixel value of at least one pixel in the initial associated image to generate the associated image corresponding to the image sample, where the pixel in the initial associated image contains a pixel corresponding to the M target areas and a pixel corresponding to an area other than the M target areas, and a pixel value of the pixel corresponding to the M target areas is set in a different manner than a pixel value of the pixel corresponding to the area other than the M target areas.

Further, the processing module 802 is specifically configured to:

randomly set the pixel value of the pixel corresponding to the M target areas;

set the pixel value of the pixel corresponding to the area other than the M target areas in the initial associated image to 1 to obtain the associated image corresponding to the image sample;

for each image sample, multiply a pixel value of each pixel of the image sample by a pixel value of a corresponding pixel of the associated image to obtain the preprocessed image sample set.

Further, the processing apparatus for the image recognition model further includes:

a to-be-recognized image obtaining module configured to obtain a to-be-recognized image, where the to-be-recognized image contains a recognition object; and a recognition module configured to input the to-be-recognized image into the image recognition model to obtain a recognition result.

The apparatus provided by the embodiment of the present application can implement the above-mentioned method as shown in the embodiment shown in FIG. 3. The implementation principles and technical effects are similar and will not be described again here.

Figure 9:
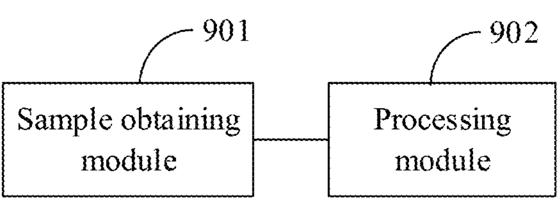
FIG. 9 is a schematic structural diagram of a processing apparatus for an image recognition model provided by an embodiment of the present application.

Based on the same idea, embodiments of this specification further provide an apparatus corresponding to the above method. FIG. 9 is a schematic structural diagram of a processing apparatus for an image recognition model provided by an embodiment of the present application. As shown in FIG. 9, the apparatus provided by this embodiment of the present application may include:

a sample obtaining module 901 configured to obtain an image sample set, where the image sample set includes at least one image sample; and a processing module 902 configured to determine a target object positioning box of each image sample, where the target object positioning box covers an area where an effective feature of the image sample is located;

the processing module 902 is further configured to adjust a pixel value of at least one pixel within the target object positioning box of each image sample to obtain a preprocessed image sample set;

the processing module 902 is further configured to train a network model based on the preprocessed image sample set to obtain the image recognition model.

In addition, in another embodiment, the processing module 902 is further configured to:

input the image sample into a self-supervised learning model to obtain feature map information, where the self-supervised learning model is used to extract the effective feature of the image sample; and determine the target object positioning box of the image sample according to the feature map information.

Further, the processing module 902 is specifically configured to:

input the image sample into the self-supervised learning model for N times to obtain N pieces of feature map information, where Nis a natural number greater than or equal to 1; and determine the target object positioning box of the image sample according to the N pieces of feature map information.

An amount of the feature map information is N, and N is a natural number greater than or equal to 1. The processing module 902 is specifically configured to:

for each piece of the feature map information, perform a normalization processing on the feature map information to obtain a heat map, determine a target point with a heat value greater than a preset threshold from the heat map, and determine an initial target object positioning box based on the target point, where the heat map contains at least one pixel, a magnitude of a heat value of the pixel represents a probability that the pixel contains an effective feature, and the heat value of the at least one pixel is within a preset interval; and determine an average value of the N initial target object positioning boxes to obtain the target object positioning box.

Further, the initial target object positioning box is a polygonal box, and the processing module 902 is specifically configured to:

for each vertex of any one of the N initial target object positioning boxes, determine an average value of coordinates corresponding to each vertex, where a number of coordinates of each vertex is N; and obtain the target object positioning box according to the average value of the coordinates corresponding to each vertex.

In addition, in another embodiment, the processing module 902 is further configured to:

for each image sample, generate an associated image corresponding to the image sample according to the target object positioning box of the image sample, where a size of the associated image is identical to a size of the image sample; and adjust the pixel value of the at least one pixel within the target object positioning box of each image sample according to the associated image corresponding to each image sample to obtain the preprocessed image sample set.

Further, the processing module 902 is specifically configured to:

generate an initial associated image with a same size as the image sample;

select M center points from the initial associated image, and determine M target areas based on the M center points, where M is a natural number greater than or equal to 1, and the M center points are pixels within the target object positioning box; and set a pixel value of at least one pixel in the initial associated image to generate the associated image corresponding to the image sample, where the pixel in the initial associated image contains a pixel corresponding to the M target areas and a pixel corresponding to an area other than the M target areas, and a pixel value of the pixel corresponding to the M target areas is set in a different manner than a pixel value of the pixel corresponding to the area other than the M target areas.

Further, the processing module 902 is specifically configured to:

randomly set the pixel value of the pixel corresponding to the M target areas;

set the pixel value of the pixel corresponding to the area other than the M target areas in the initial associated image to 1 to obtain the associated image corresponding to the image sample; and for each image sample, multiply a pixel value of each pixel of the image sample by a pixel value of a corresponding pixel of the associated image to obtain the preprocessed image sample set.

The apparatus provided by the embodiment of the present application can implement the method of the embodiment shown in FIG. 4. The implementation principles and technical effects are similar and will not be described again here.

Figure 10:
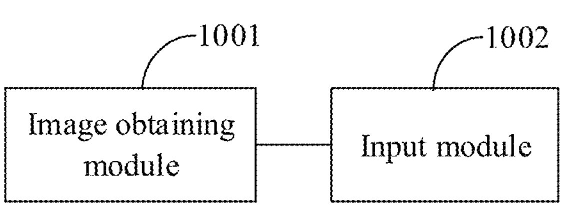
FIG. 10 is a schematic structural diagram of an image recognition apparatus provided by an embodiment of the present application.

FIG. 10 is a schematic structural diagram of an image recognition apparatus provided by an embodiment of the present application. As shown in FIG. 10, the apparatus provided by an embodiment of the present application may include:

an image obtaining module 1001, configured to obtain a to-be-recognized image, where the to-be-recognized image contains a recognition object which may include, for example, at least one of a traffic sign, a vehicle license plate, a user, an animal, a plant and a building;

an input module 1002, configured to input the to-be-recognized image into an image recognition model to obtain a recognition result, where the image recognition model is obtained through training based on a preprocessed image sample set, the preprocessed image sample set is obtained by determining a target object positioning box of each image sample in an image sample set and then adjusting a pixel value of at least one pixel within the target object positioning box of each image sample.

Further, the image recognition model is obtained through training using the processing method for the image recognition model as shown in FIG. 3 or FIG. 4.

The apparatus provided by the embodiment of the present application can implement the above-mentioned method as shown in the embodiment shown in FIG. 7. The implementation principles and technical effects are similar and will not be described again here.

Figure 11:
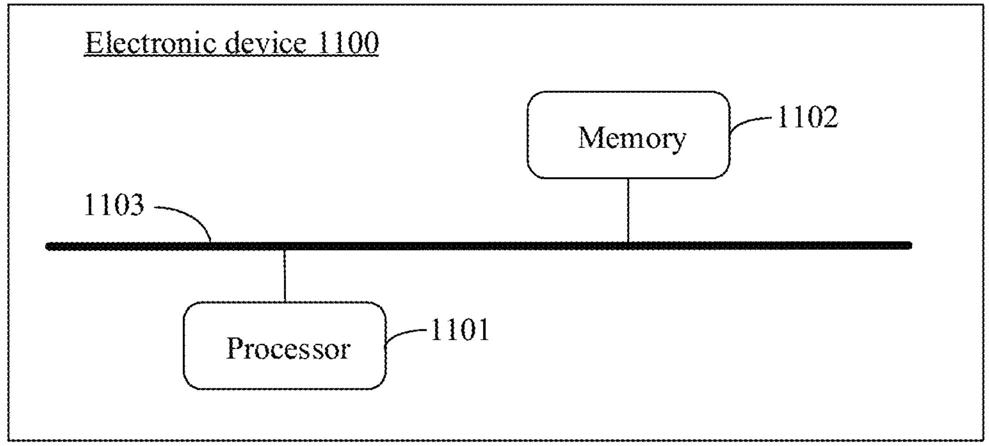
FIG. 11 is a schematic diagram of a hardware structure of an electronic device provided by an embodiment of the present application.

FIG. 11 is a schematic diagram of a hardware structure of an electronic device provided by an embodiment of the present application. As shown in FIG. 11, a device 1100 provided by this embodiment includes a processor 1101 and a memory 1102 communicatively connected to the processor. The processor 1101 and the memory 1102 are connected through a bus 1103.

During a specific implementation, the processor 1101 executes computer-executed instructions stored in the memory 1102, so that the processor 1101 executes the method in the above method embodiments.

For the specific implementation process of the processor 1101, please refer to the above-mentioned method embodiments. The implementation principles and technical effects are similar and will not be described again in this embodiment.

In the above-mentioned embodiment shown in FIG. 11, it should be understood that the processor can be a central processing unit (CPU), or other general-purpose processor, a digital signal processor (DSP), an application specific integrated circuit (ASIC), etc. A general-purpose processor may be a microprocessor or the processor may be any conventional processor, etc. The steps of the method disclosed in conjunction with the present disclosure can be directly embodied and executed by a hardware processor, or executed by a combination of hardware and software modules in the processor.

The memory may include a high-speed random access memory (RAM), and may also include a non-volatile memory (NVM), such as at least one disk memory.

The bus can be an industry standard architecture (ISA) bus, a peripheral component interconnect (PCI) bus or an extended industry standard architecture (EISA) bus, etc. The bus can be divided into an address bus, a data bus, a control bus, etc. For ease of presentation, the bus in the drawings of the present application is not limited to only one bus or one type of bus.

An embodiment of the present application further provides a computer-readable storage medium storing computer-executed instructions. A processor, when executing the computer-executed instructions, implements the method of the above method embodiments.

An embodiment of the present application further provides a computer program product, which includes a computer program. The computer program, when executed by a processor, implements the method of the above embodiments.

An embodiment of the present application further provides a computer program, which can be executed by a processor of a computer device to implement the method in the above embodiments.

The above-mentioned computer-readable storage medium can be implemented by any type of volatile or non-volatile storage device or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk. The readable storage medium can be any available medium that can be accessed by a general purpose or special purpose computer.

An example readable storage medium is coupled to the processor such that the processor can read information from the readable storage medium and write information to the readable storage medium. Of course, the readable storage medium may also be a component part of the processor. The processor and the readable storage medium may be located in an application specific integrated circuit (ASIC). Of course, the processor and the readable storage medium may also exist as discrete components in the device.

Persons of ordinary skill in the art can understand that all or part of the steps to implement the above method embodiments can be completed by hardware related to program instructions. The aforementioned program can be stored in a computer-readable storage medium. When the program is executed, the steps including the above-mentioned method embodiments are executed; and the aforementioned storage medium includes: a ROM, a RAM, a magnetic disk, an optical disk and other media that can store program codes.

Finally, it should be noted that the above embodiments are only used to illustrate the technical solution of the present application, but not to limit it; although the present application has been described in detail with reference to the foregoing embodiments, those of ordinary skill in the art should understand that: modifications can still be made to the technical solutions described in the foregoing embodiments, or equivalent substitutions can still be made to some or all of the technical features; and these modifications or substitutions do not cause the essence of the corresponding technical solutions to deviate from the scope of the technical solutions of the embodiments of the present application.

What is claimed is:

1. A processing method for an image recognition model, comprising:

obtaining an image sample;

determining a target object positioning box of the image sample, wherein the target object positioning box covers an area where an effective feature of the image sample is located;

adjusting a pixel value of at least one pixel within the target object positioning box to obtain a preprocessed image sample; and training a network model based on the preprocessed image sample to obtain the image recognition model;

wherein the determining the target object positioning box of the image sample comprises:

inputting the image sample into a self-supervised learning model to obtain feature map information, wherein the self-supervised learning model is used to extract the effective feature of the image sample; and determining the target object positioning box of the image sample according to the feature map information;

wherein an amount of the feature map information is N, and N is a natural number greater than or equal to 1, and the determining the target object positioning box of the image sample according to the feature map information comprises:

for each piece of the feature map information, performing a normalization processing on the feature map information to obtain a heat map, determining a target point with a heat value greater than a preset threshold from the heat map, and determining an initial target object positioning box based on the target point, wherein the heat map contains at least one pixel, a magnitude of a heat value of the pixel represents a probability that the pixel contains an effective feature, and the heat value of the at least one pixel is within a preset interval; and determining an average value of the N initial target object positioning boxes to obtain the target object positioning box.

2. The method according to claim 1, further comprising: obtaining an image sample set, wherein the image sample set comprises at least one of the image sample.

3. The method according to claim 2, wherein the adjusting the pixel value of the at least one pixel within the target object positioning box to obtain the preprocessed image sample comprises:

adjusting the pixel value of the at least one pixel within the target object positioning box of each image sample, and forming the at least one preprocessed image sample into a preprocessed image sample set.

4. The method according to claim 3, wherein the adjusting the pixel value of the at least one pixel within the target object positioning box to obtain the preprocessed image sample comprises:

generating an associated image corresponding to the image sample according to the target object positioning box of the image sample, wherein a size of the associated image is identical to a size of the image sample; and adjusting the pixel value of the at least one pixel within the target object positioning box of the image sample according to the associated image corresponding to the image sample to obtain the preprocessed image sample set.

5. The method according to claim 4, wherein the generating the associated image corresponding to the image sample according to the target object positioning box of the image sample comprises:

generating an initial associated image with a same size as the image sample;

selecting M center points from the initial associated image, and determining M target areas based on the M center points, wherein M is a natural number greater than or equal to 1, and the M center points are pixels within the target object positioning box; and setting a pixel value of at least one pixel in the initial associated image to generate the associated image corresponding to the image sample, wherein the pixel in the initial associated image contains a pixel corresponding to the M target areas and a pixel corresponding to an area other than the M target areas, and a pixel value of the pixel corresponding to the M target areas is set in a different manner than a pixel value of the pixel corresponding to the area other than the M target areas.

6. The method according to claim 5, wherein the setting the pixel value of the at least one pixel in the initial associated image to generate the associated image corresponding to the image sample comprises:

randomly setting the pixel value of the pixel corresponding to the M target areas;

setting the pixel value of the pixel corresponding to the area other than the M target areas in the initial associated image to 1 to obtain the associated image corresponding to the image sample;

correspondingly, the adjusting the pixel value of the at least one pixel within the target object positioning box of each image sample according to the associated image corresponding to each image sample to obtain the preprocessed image sample set comprises:

for each image sample, multiplying a pixel value of each pixel of the image sample by a pixel value of a corresponding pixel of the associated image to obtain the preprocessed image sample set.

7. The method according to claim 1, wherein the initial target object positioning box is a polygonal box, and the determining the average value of the N initial target object positioning boxes to obtain the target object positioning box comprises:

for each vertex of any one of the N initial target object positioning boxes, determining an average value of coordinates corresponding to each vertex, wherein a number of coordinates of each vertex is N; and obtaining the target object positioning box according to the average value of the coordinates corresponding to each vertex.

8. The method according to claim 1, further comprising:

obtaining a to-be-recognized image, wherein the to-be-recognized image contains a recognition object; and inputting the to-be-recognized image into the image recognition model to obtain a recognition result.

9. An electronic device, comprising: a processor, and a memory communicatively connected to the processor;

wherein the memory stores computer-executed instructions;

the processor, when executing the computer-executed instructions stored in the memory, is configured to:

obtain an image sample;

determine a target object positioning box of the image sample, wherein the target object positioning box covers an area where an effective feature of the image sample is located;

adjust a pixel value of at least one pixel within the target object positioning box to obtain a preprocessed image sample; and train a network model based on the preprocessed image sample to obtain the image recognition model;

wherein the processor is configured to:

adjust the pixel value of the at least one pixel within the target object positioning box of each image sample, and form the at least one preprocessed image sample into a preprocessed image sample set;

wherein an amount of the feature map information is N, and N is a natural number greater than or equal to 1, and the processor is configured to:

for each piece of the feature map information, perform a normalization processing on the feature map information to obtain a heat map, determine a target point with a heat value greater than a preset threshold from the heat map, and determine an initial target object positioning box based on the target point, wherein the heat map contains at least one pixel, a magnitude of a heat value of the pixel represents a probability that the pixel contains an effective feature, and the heat value of the at least one pixel is within a preset interval; and determine an average value of the N initial target object positioning boxes to obtain the target object positioning box.

10. The electronic device according to claim 9, wherein the processor is configured to:

obtain an image sample set, wherein the image sample set comprises at least one of the image sample.

11. The electronic device according to claim 10, wherein the processor is configured to:

adjust the pixel value of the at least one pixel within the target object positioning box of each image sample, and form the at least one preprocessed image sample into a preprocessed image sample set.

12. The electronic device according to claim 11, wherein the processor is configured to:

generate an associated image corresponding to the image sample according to the target object positioning box of the image sample, wherein a size of the associated image is identical to a size of the image sample; and adjust the pixel value of the at least one pixel within the target object positioning box of the image sample according to the associated image corresponding to the image sample to obtain the preprocessed image sample set.

13. The electronic device according to claim 12, wherein the processor is configured to:

generate an initial associated image with a same size as the image sample;

select M center points from the initial associated image, and determine M target areas based on the M center points, wherein M is a natural number greater than or equal to 1, and the M center points are pixels within the target object positioning box; and set a pixel value of at least one pixel in the initial associated image to generate the associated image corresponding to the image sample, wherein the pixel in the initial associated image contains a pixel corresponding to the M target areas and a pixel corresponding to an area other than the M target areas, and a pixel value of the pixel corresponding to the M target areas is set in a different manner than a pixel value of the pixel corresponding to the area other than the M target areas.

14. The electronic device according to claim 13, wherein the processor is configured to:

randomly set the pixel value of the pixel corresponding to the M target areas;

set the pixel value of the pixel corresponding to the area other than the M target areas in the initial associated image to 1 to obtain the associated image corresponding to the image sample; and for each image sample, multiply a pixel value of each pixel of the image sample by a pixel value of a corresponding pixel of the associated image to obtain the preprocessed image sample set.

15. The electronic device according to claim 9, wherein the initial target object positioning box is a polygonal box, and the processor is configured to:

for each vertex of any one of the N initial target object positioning boxes, determine an average value of coordinates corresponding to each vertex, wherein a number of coordinates of each vertex is N; and obtain the target object positioning box according to the average value of the coordinates corresponding to each vertex.

16. The electronic device according to claim 9, wherein the processor is configured to:

obtain a to-be-recognized image, wherein the to-be-recognized image contains a recognition object; and input the to-be-recognized image into the image recognition model to obtain a recognition result.

17. A non-transitory computer-readable storage medium with computer-executed instructions stored therein, wherein a processor, when executing the computer-executed instructions, is configured to:

obtain an image sample;

determine a target object positioning box of the image sample, wherein the target object positioning box covers an area where an effective feature of the image sample is located;

adjust a pixel value of at least one pixel within the target object positioning box to obtain a preprocessed image sample; and train a network model based on the preprocessed image sample to obtain the image recognition model;

wherein the processor is configured to:

adjust the pixel value of the at least one pixel within the target object positioning box of each image sample, and form the at least one preprocessed image sample into a preprocessed image sample set;

wherein an amount of the feature map information is N, and N is a natural number greater than or equal to 1, and the processor is configured to:

for each piece of the feature map information, perform a normalization processing on the feature map information to obtain a heat map, determine a target point with a heat value greater than a preset threshold from the heat map, and determine an initial target object positioning box based on the target point, wherein the heat map contains at least one pixel, a magnitude of a heat value of the pixel represents a probability that the pixel contains an effective feature, and the heat value of the at least one pixel is within a preset interval; and determine an average value of the N initial target object positioning boxes to obtain the target object positioning box.

18. The non-transitory computer-readable storage medium according to claim 17, wherein the processor is configured to:

obtain an image sample set, wherein the image sample set comprises at least one of the image sample.

19. The non-transitory computer-readable storage medium according to claim 18, wherein the processor is configured to:

adjust the pixel value of the at least one pixel within the target object positioning box of each image sample, and form the at least one preprocessed image sample into a preprocessed image sample set.

20. The non-transitory computer-readable storage medium according to claim 17, wherein the initial target object positioning box is a polygonal box, and the processor is configured to:

for each vertex of any one of the N initial target object positioning boxes, determine an average value of coordinates corresponding to each vertex, wherein a number of coordinates of each vertex is N; and obtain the target object positioning box according to the average value of the coordinates corresponding to each vertex.

* * * * *